United States Patent
Zhang et al.

(10) Patent No.: US 11,816,930 B2
(45) Date of Patent: Nov. 14, 2023

(54) BEHAVIOR RECOGNITION METHOD AND APPARATUS, MEDIUM, AND ELECTRONIC DEVICE

(71) Applicant: Shenzhen Horizon Robotics Technology Co., Ltd., Nanshan Dist (CN)

(72) Inventors: Yunhui Zhang, Shenzhen (CN); Zhikai Zhang, Shenzhen (CN); Cong Yang, Shenzhen (CN)

(73) Assignee: Shenzhen Horizon Robotics Technology Co., Ltd.

( * ) Notice: Subject to any disclaimer, the term of this patent is extended or adjusted under 35 U.S.C. 154(b) by 66 days.

(21) Appl. No.: 17/543,680

(22) Filed: Dec. 6, 2021

(65) Prior Publication Data

US 2022/0188537 A1 Jun. 16, 2022

(30) Foreign Application Priority Data

Dec. 14, 2020 (CN) .......................... 202011467345.X

(51) Int. Cl.
*G06V 40/20* (2022.01)
*G06V 20/40* (2022.01)
(52) U.S. Cl.
CPC .............. *G06V 40/20* (2022.01); *G06V 20/46* (2022.01); *G06V 20/44* (2022.01)
(58) Field of Classification Search
CPC ......... G06V 40/20; G06V 20/46; G06V 20/44
See application file for complete search history.

(56) References Cited

U.S. PATENT DOCUMENTS

| 2019/0135177 A1* | 5/2019 | Farrell | ...................... B60Q 9/00 |
| 2020/0039520 A1* | 2/2020 | Misu | ................. B60W 60/0013 |
| 2022/0180109 A1* | 6/2022 | Alpert | ....................... G06T 7/70 |

FOREIGN PATENT DOCUMENTS

CN     111652043 A   *   9/2020

* cited by examiner

*Primary Examiner* — Syed Haider
(74) *Attorney, Agent, or Firm* — Harness, Dickey & Pierce, P.L.C.

(57) ABSTRACT

Disclosed are a behavior recognition method and apparatus, a medium and device. The method includes: obtaining a sequence of image blocks containing a target part of a target object from a plurality of video frames obtained by a camera apparatus disposed in a mobile device; extracting a feature vector on a first preset behavior from the sequence to obtain a first feature vector corresponding to the sequence; determining a behavior type to which a behavior of the target object belongs based on the first feature vector; and if the behavior type to which the behavior belongs satisfies a first behavior type, determining the behavior based on a result of behavior recognition on a second preset behavior for the sequence. The disclosure may realize cascade recognition of the behavior of the target object, thereby helping to improve accuracy of behavior recognition and further driving safety of the mobile device.

14 Claims, 6 Drawing Sheets

S800, for any image block in a sequence of image blocks, determining, based on a first feature vector of the image block, confidences that the behavior of the target object is each of a plurality of first preset behaviors, to obtain a plurality of first confidences

S801, determining a behavior type to which the behavior of the target object belongs based on the plurality of first confidences respectively corresponding to each image block in the sequence of image blocks and a first threshold corresponding to the first preset behavior

FIG. 8

S900, performing feature vector extraction that is based on a second preset behavior to a sequence of image blocks, to obtain a second feature vector corresponding to the sequence of image blocks

S901, for any image block in the sequence of image blocks, determining, based on the second feature vector of the image block, confidences that the behavior of the target object is each of at least two second preset behaviors, to obtain at least two second confidences

S902, determining the behavior of the target object based on the at least two second confidences respectively corresponding to each image block in the sequence of image blocks and second thresholds respectively corresponding to the at least two second preset behaviors

FIG. 9

BEHAVIOR RECOGNITION METHOD AND APPARATUS, MEDIUM, AND ELECTRONIC DEVICE

RELATED APPLICATION INFORMATION

This application claims priority to Chinese patent application No. 202011467345.X, filed on Dec. 14, 2020, incorporated herein by reference.

FIELD OF THE INVENTION

The present disclosure relates to computer vision technologies, and in particular, to a behavior recognition method, a behavior recognition apparatus, a storage medium, and an electronic device.

BACKGROUND OF THE INVENTION

In the field of driving, some behaviors of a driver and a passenger of a mobile device may affect safe driving of the mobile device. Therefore, it is much necessary to recognize a behavior of a target object in the mobile device, and take measures timely when the recognized behavior of the target object is a behavior that is adverse to safe driving of the mobile device, to reduce impact of the behavior of the target object on the safe driving of the mobile device as possible.

SUMMARY OF THE INVENTION

To resolve the foregoing technical problem, the present disclosure is proposed. Embodiments of the present disclosure provide a behavior recognition method and apparatus, a storage medium, and an electronic device.

According to an aspect of an embodiment of the present disclosure, there is provided a behavior recognition method, including: obtaining a sequence of image blocks containing a target part of a target object from a plurality of video frames obtained by a camera apparatus disposed in a mobile device; performing feature vector extraction that is based on a first preset behavior to the sequence of image blocks, to obtain a first feature vector corresponding to the sequence of image blocks; determining, based on the first feature vector, a behavior type to which a behavior of the target object belongs; and if the behavior type to which the behavior of the target object belongs satisfies a first behavior type, determining the behavior of the target object based on a result of performing behavior recognition on a second preset behavior for the sequence of image blocks.

According to another aspect of an embodiment of the present disclosure, there is provided a behavior recognition apparatus, including: a sequence obtaining module, configured to obtain a sequence of image blocks containing a target part of a target object from a plurality of video frames obtained by a camera apparatus disposed in a mobile device; a feature vector obtaining module, configured to perform feature vector extraction that is based on a first preset behavior to the sequence of image blocks obtained by the sequence obtaining module, to obtain a first feature vector corresponding to the sequence of image blocks; a behavior type determining module, configured to determine a behavior type to which a behavior of the target object belongs based on the first feature vector obtained by the feature vector obtaining module; and a cascade recognition module, configured to determine the behavior of the target object based on a result of performing behavior recognition on a second preset behavior for the sequence of image blocks if the behavior type, determined by the behavior type determining module, to which the behavior of the target object belongs satisfies a first behavior type.

According to yet another aspect of an embodiment of the present disclosure, there is provided a computer readable storage medium, where the storage medium stores a computer program used to implement the foregoing method.

According to still another aspect of an embodiment of the present disclosure, there is provided an electronic device, including: a processor; and a memory configured to store processor-executable instructions, wherein the processor is configured to read the executable instructions from the memory and execute the instructions to implement the foregoing method.

On the basis of the behavior recognition method and apparatus provided in the embodiments of the present disclosure, by extracting the image blocks containing the target part of the target object such as a driver or a passenger in the mobile device from the video frames obtained by the camera apparatus disposed in the mobile device, and obtaining the first feature vector from the sequence of image blocks, according to the present disclosure, the behavior type to which the behavior of the target object belongs may be obtained based on the first feature vector. When the behavior type to which the behavior of the target object belongs satisfies the first behavior type (for example, a suspected behavior type), according to the present disclosure, the behavior of the target object may be determined based on the result of performing behavior recognition on the second preset behavior for the sequence of image blocks. Therefore, according to the present disclosure, cascaded recognition of the behavior of the target object is realized, thereby helping to avoid influence on accuracy of behavior recognition caused by that a threshold for behavior recognition is set too high or too low. In view of the above, the technical solutions provided in the present disclosure are helpful for improving the accuracy of behavior recognition. Moreover, driving safety of the mobile device is improved by taking corresponding measures such as voice prompts, light prompts, or vibration prompts for a recognized behavior (such as a dangerous driving behavior or a hazardous driving behavior that affects driving of the driver) of the target object.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, and are used to explain the present disclosure together with the embodiments of the present disclosure, but do not constitute limitation to the present disclosure. In the accompanying drawings, the same reference numerals generally represent the same components or steps.

FIG. 8 is a flowchart of determining a behavior type to which a behavior of a target object belongs according to an embodiment of the present disclosure;

FIG. 9 is a flowchart of determining a behavior of a target object according to an embodiment of the present disclosure;

DETAILED DESCRIPTION OF THE EMBODIMENTS

Figure 1:
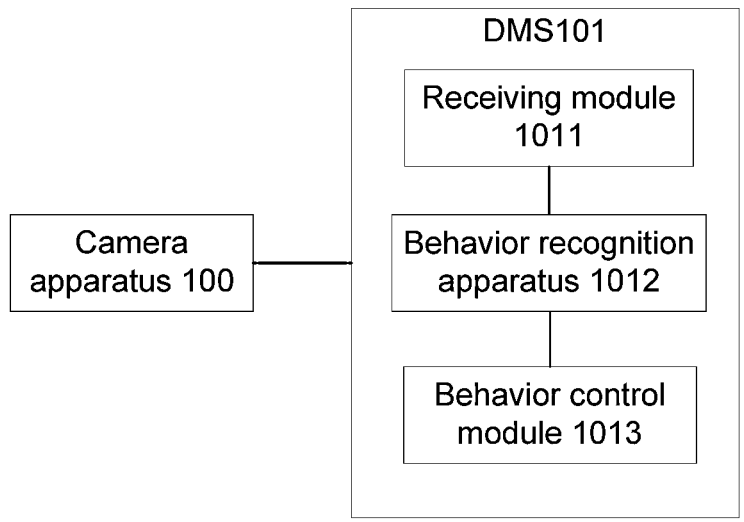
FIG. 1 is a schematic diagram of a DMS structure of a vehicle according to an embodiment of the present disclosure.

In the following, exemplary embodiments according to the present disclosure are described in detail with reference to the accompanying drawings. Obviously, the described embodiments are merely a part, rather than all of embodiments of the present disclosure. It should be understood that the present disclosure is not limited by the exemplary embodiments described herein.

It should be noted that unless otherwise specified, the scope of the present disclosure is not limited by relative arrangement, numeric expressions, and numerical values of components and steps described in these embodiments.

A person skilled in the art may understand that terms such as "first" and "second" in the embodiments of the present disclosure are merely configured to distinguish between different steps, devices, or modules, and indicate neither any particular technical meaning, nor necessarily logical ordering among them.

It should be further understood that, in the embodiments of the present disclosure, the term "multiple/a plurality of" may refer to two or more; and the term "at least one" may refer to one, two, or more.

It should be further understood that, any component, data, or structure involved in the embodiments of the present disclosure may be generally construed to one or more, unless clearly stated or the context indicates otherwise.

In addition, the term "and/or" in the present disclosure refers to only an association relationship that describes associated objects, indicating presence of three relationships. For example, A and/or B may indicate presence of three cases: A alone, both A and B, and B alone. In addition, the character "/" in the present disclosure generally indicates an "or" relationship of associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, and never serve as any limitation to the present disclosure long with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal device, the computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems, and the like.

The terminal device, the computer system, the server, and other electronic devices may be described in general context of computer system-executable instructions (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is executed by a remote processing device linked through a communications network. In the distributed cloud computing environment, the program module may be located on a storage medium of a local or remote computing system including a storage device.

Overview of the Present Disclosure

In a process of implementing the present disclosure, the inventors find that a driver monitoring system (DMS) in a mobile device usually recognizes a behavior based on a preset threshold. For example, after the DMS performs corresponding processing on a video frame collected by a camera apparatus, a processing result may be measured by using a preset threshold for determining whether a current behavior is a dangerous driving behavior, so as to determine whether the current behavior of a driver is a dangerous driving behavior.

In practical applications, usually, there are similar behaviors. For example, a smoking behavior is similar to a behavior of using a straw, where the smoking behavior is a dangerous driving behavior, but the behavior of using a straw is not a dangerous driving behavior. If a threshold for determining whether the current behavior is a dangerous driving behavior is set too high, a detection of the dangerous driving behavior may be missed. Moreover, if the threshold used for determining whether the current behavior is a dangerous driving behavior is set too low, the dangerous driving behavior may be falsely detected.

Due to diversity of behaviors of different target objects, it is generally difficult to accurately set a threshold for determining whether the current behavior is a dangerous driving behavior. However, if cascaded behavior recognition can be performed on the target object in the video frame, accuracy of behavior recognition may be improved.

Exemplary Overview

The technical solutions of behavior recognition in the present disclosure may be applied to a plurality of scenarios. For example, the technical solutions of the behavior recognition provided in the present disclosure may be applied to DMS applications. An example is shown in FIG. 1.

Applications of the behavior recognition technology in the present disclosure are described below with reference to FIG. 1.

In FIG. 1, a vehicle is configured with at least one camera apparatus 100 and a DMS 101, and a video frame obtained by the camera apparatus 100 may be provided to the DMS 101 in a real-time manner. When a driver is at a driving position of the vehicle, a face portion of the driver needs to be within a field of view of the camera apparatus 100. In other words, a video obtained by the camera apparatus 100 usually includes the face portion (such as the front face) of the driver.

Applications of the behavior recognition technology in the present disclosure are described below with reference to FIG. 1

In FIG. 1, exemplary description is made by using an example in which a mobile device is a vehicle. A vehicle is configured with at least one camera apparatus 100 and a DMS 101, and a video frame obtained by the camera apparatus 100 may be provided to the DMS 101 in a real-time manner. When the driver is at a driving position of the vehicle, the face portion of the driver needs to be within the field of view of the camera apparatus 100. In other words, a video obtained by the camera apparatus 100 usually includes the face portion (such as the front face) and other areas of the driver.

The DMS 101 at least includes a receiving module 1011, a behavior recognition apparatus 1012, and a behavior control module 1013. After receiving the video frame transmitted in a real-time manner from the camera apparatus 100, the receiving module 1011 triggers the behavior recognition apparatus 1012 to recognize a dangerous driving behavior for the video frame received thereby. The behavior recognition apparatus 1012 determines a behavior of a target object in a plurality of video frames with in each time window (for example, 2 seconds). If the behavior of the target object determined by the behavior recognition apparatus 1012 is a dangerous driving behavior, the behavior control module 1013 may prompt the driver through voice prompts, light prompts, or vibration prompts, to ensure safe driving of the vehicle.

During a process in which the behavior recognition apparatus 1012 recognizes a dangerous driving behavior, if it is determined that a current behavior of the driver is another behavior similar to the dangerous driving behavior, the behavior recognition apparatus 1012 may perform cascaded behavior recognition on the current behavior of the driver, to determine whether the current behavior of the driver is another behavior similar to the dangerous driving behavior. If the current behavior is another behavior similar to the dangerous driving behavior, the behavior recognition apparatus 1012 may avoid a false positive of the dangerous driving behavior. If the current behavior is not another behavior similar to the dangerous driving behavior, the behavior recognition apparatus 1012 may consider that the current behavior of the driver is a dangerous driving behavior, so that a false negative of the dangerous driving behavior may be avoided.

In addition, the technical solutions of behavior recognition provided in the present disclosure may be further applicable to in-cabin monitoring system (IMS) applications. For example, according to the present disclosure, the IMS in the vehicle may be used to recognize a behavior of a person in a passenger seat of the vehicle or a person at a rear position of the vehicle, so that a behavior that is from the person in the passenger seat or from the person at the rear position of the vehicle and is adverse to safe driving of the vehicle, may be recognized. Specific implementations of applying the technical solutions provided in the present disclosure to the IMS applications are substantially the same as the foregoing specific implementations of applying the technical solutions to the DMS applications. Details are not described herein.

Exemplary Method

Figure 2:
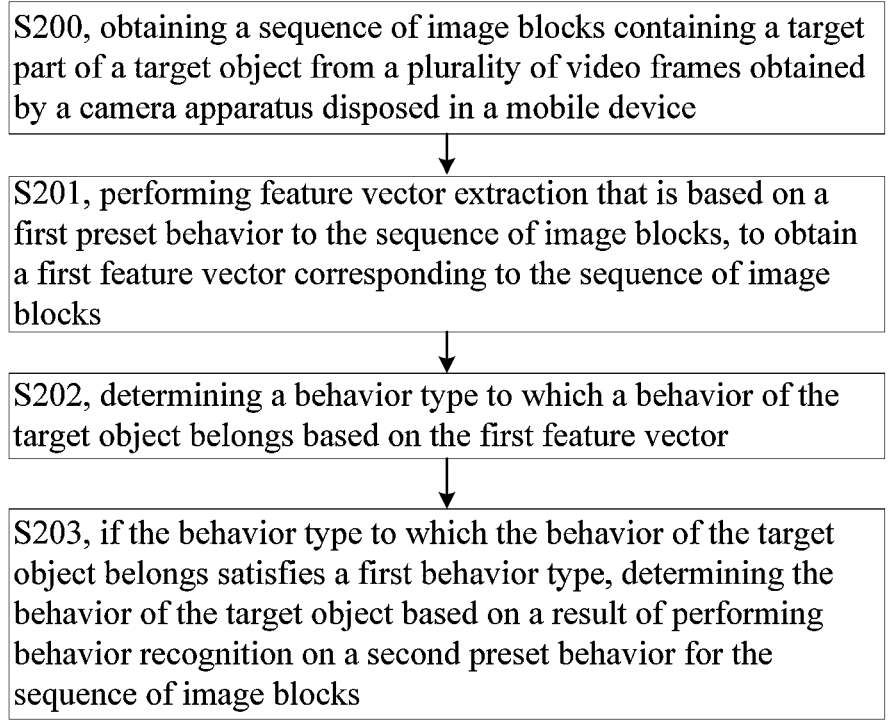
FIG. 2 is a flowchart of a behavior recognition method according to an embodiment of the present disclosure.

FIG. 2 is a flowchart of a behavior recognition method according to an embodiment of the present disclosure. The method shown in FIG. 2 mainly includes S200, S201, S202, and S203. The steps are described separately below.

S200, obtaining a sequence of image blocks containing a target part of a target object from a plurality of video frames obtained by a camera apparatus disposed in a mobile device.

The mobile device in the present disclosure may be a vehicle capable of carrying people, for example, a private car or a public vehicle. The target object in the present disclosure usually may refer to a driver of the mobile device. Certainly, the target object may also refer to another one in the mobile device, such as a person in a passenger seat or a passenger in the public vehicle.

When the target object is a driver of the mobile device, the camera apparatus in the present disclosure may be mounted at a position such as a steering column or an A-pillar at a driver side of the mobile device. A mounting position of the camera apparatus needs to ensure that a face portion (such as the front face) of the driver at a driving position is within a field of view of the camera apparatus. When the target object is a passenger in the mobile device, the mounting position of the camera apparatus may be set according to actual requirements. For example, the camera apparatus may be mounted at a position such as an A-pillar at a passenger-seat side of the mobile device, to ensure that a face portion (such as the front face) of the passenger in the passenger seat is within the field of view of the camera apparatus. For another example, the camera apparatus may be mounted at a position such as a B-pillar or back of a front seat of the mobile device, to ensure that a face portion (such as the front face) of a passenger in a back seat is within the field of view of the camera apparatus. In addition, a plurality of camera apparatuses may be mounted in the mobile device, so as to take pictures for the driver and at least one passenger in a real-time manner. In this way, behaviors of the driver and the at least one passenger may be recognized based on the video frames obtained by all camera apparatuses.

The camera apparatus in the present disclosure may be an RGB (red, green, and blue)-based camera apparatus or an IR (infrared radiation)-based camera apparatus. In addition, the camera apparatus may be a monocular camera apparatus or a binocular camera apparatus.

The plurality of video frames in the present disclosure may be all video frames in a predetermined time window (for example, n seconds, where n is a positive number); or may be some of video frames selected from all video frames in a predetermined time window. In an example, the plurality of video frames in the present disclosure may be a plurality of video frames containing the face portion of the target object that are selected from all video frames in a predetermined time window.

The target part of the target object in the present disclosure is usually related to a behavior that needs to be recognized. In other words, the target part of the target object in the present disclosure is usually a part involved in the behavior that needs to be recognized. Moreover, the target part of the target object in the present disclosure may include one part or a plurality of different parts of the body of the target object.

For example, if the behaviors that need to be recognized include a smoking behavior, the target part of the target object may include a lower part of a face portion, for example, a lower part of the face portion that includes the nose and the mouth.

For another example, if the behaviors that need to be recognized include a smoking behavior, the target part of the target object may include a lower part of a face portion and a hand part.

For yet another example, if the behaviors that need to be recognized include a call-making behavior, the target part of the target object may include a left/right part of a face portion, for example, a left/right part of the face portion that includes the left/right cheek.

For still another example, if the behaviors that need to be recognized include a call-making behavior, the target part of the target object may include a left/right part of a face portion and a hand part.

A specific manifestation of the target part of the target object contained in each image block in the sequence of image blocks is not limited in the present disclosure.

The obtained sequence of image blocks containing the target part of the target object in the present disclosure may be considered as: a sequence of image blocks that is obtained by arranging, according to acquisition time of the video frames, image blocks with a same size that are respectively cut out from each video frame and contain the target part of the target object.

In addition, according to the present disclosure, the sequence of image blocks containing the target part of the target object which is obtained from a plurality of video frames may be one sequence of image blocks. The sequence of image blocks may refer to a plurality of sequences of image blocks and different sequences of the image blocks usually correspond to different behaviors that need to be recognized. In an example, if behaviors that need to be recognized include a smoking behavior and a call-making behavior, according to the present disclosure, a first sequence of image blocks may be obtained for the smoking behavior, and a second sequence of image blocks may be obtained for the call-making behavior. For example, the first sequence of image blocks may be a sequence of image blocks composed of a plurality of image blocks that respectively contain the lower part of the face portion and the hand part. For another example, the second sequence of image blocks may be a sequence of image blocks composed of a plurality of image blocks that respectively contain the left/right part of the face portion and the hand part.

According to the present disclosure, the image block containing the target part of the target object in each video frame may be obtained by respectively performing image recognition and other processing on the plurality of video frames, so as to obtain the sequence of image blocks that is based on the target part. For example, for any video frame, according to the present disclosure, at least one region of interest (ROI) in the video frame may be obtained through a first neural network for image recognition, and the video frame may be cropped according to the at least one ROI (for example, a crop box is formed based on a plurality of ROIs, and the video frame is cropped based on the crop box), to obtain the image block of the video frame. After all video frames are cropped, the sequence of image blocks that is based on the target part is obtained.

In an example, the first neural network may be a neural network based on area detection, such as faster regions with convolutional neural networks (RCNN). An operation process of the neural network in the present disclosure may be realized by using a data processing unit such as a central processing unit (CPU), a graphics processing unit (GPU), or a brain processing unit (BPU).

S201, performing feature vector extraction that is based on a first preset behavior to the sequence of image blocks, to obtain a first feature vector corresponding to the sequence of image blocks.

First preset behaviors in the present disclosure may include a plurality of behaviors that need to be recognized. For example, the first preset behaviors may include: at least one dangerous behavior or prohibited behavior or prescribed behavior, at least one non-dangerous behavior or non-prohibited behavior or non-prescribed behavior, at least one suspected dangerous behavior or suspected prohibited behavior or suspected prescribed behavior, and the like. At least one of the plurality of behaviors included in the first preset behaviors in the present disclosure belongs to a first behavior type, and the remaining behaviors may belong to a second behavior type.

According to the present disclosure, the feature vector extraction that is based on the first preset behavior is a manner for extracting a feature vector, and the manner for extracting a feature vector is set for a purpose of recognizing the first preset behavior. For example, according to the present disclosure, the feature vector extraction may be realized by using a neural network. According to the present disclosure, the neural network may be trained by using training samples with annotation information of the first preset behavior, and a network parameter of the neural network is obtained after the neural network is successfully trained. Feature vector extraction performed by a neural network processing unit using the network parameter is the feature vector extraction that is based on the first preset behavior.

According to the present disclosure, an example of a process of performing feature vector extraction that is based on the first preset behavior to the sequence of image blocks by using the neural network may be: performing operation on each image block in the sequence of image blocks by using a second neural network used for feature extraction, and obtaining a respective feature vector (for example, a one-dimensional array formed by a plurality of vector elements used to describe features of the target part) of each image block in the sequence of image blocks based on an operation result of the second neural network. The feature vectors of all image blocks are the first feature vector corresponding to the sequence of image blocks.

The second neural network in the present disclosure may be a convolutional neural network or the like. Moreover, according to the present disclosure, the feature vectors of all image blocks may be obtained by using one second neural network or by using a plurality of second neural networks. The plurality of second neural networks usually have a same network structure and a same network parameter. It should be noted that operations of the first neural network and the second neural network may be implemented by a same neural network processing unit, for example, may be implemented by a same BPU or a same GPU. Similarly, neural networks based on different operational processing involved in this embodiment of the present disclosure may all be implemented by a same neural network processing unit. Details are not described herein again.

S202, determining, based on the first feature vector, a behavior type to which a behavior of the target object belongs.

The behavior type in the present disclosure may refer to a classification of behaviors formed by classifying the behaviors. According to the present disclosure, at least two behavior types are set for the behaviors included in the first preset behaviors, and one of the behavior types is the first behavior type.

In an example, the first behavior type may refer to a type that cannot accurately determine whether a behavior of the target object is a particular behavior (such as a dangerous behavior). The first behavior type may be referred to as a type of suspected particular behaviors (such as a type of suspected dangerous behaviors).

In an example, the type of suspected particular behaviors specifically may be a type of suspected smoking behaviors or a type of suspected call-making behaviors. If there are a plurality of particular behaviors, the first behavior type in the present disclosure may include a plurality of suspected particular behaviors.

According to the present disclosure, a behavior classification result may be obtained by performing behavior classification on the first feature vector of the sequence of image blocks; and the behavior classification result may be determined by using a condition preset for the suspected particular behavior included in the first behavior type and a condition preset for a particular behavior included in the second behavior type, so as to determine the behavior type to which the behavior of the target object belongs.

In an example, according to the present disclosure, behavior classification may be performed on the first feature vector by using a third neural network for behavior classification, and the behavior type to which the behavior of the target object belongs may be determined based an operation result of the third neural network, the condition preset for the suspected particular behavior included in the first behavior type, and the condition preset for the particular behavior included in the second behavior type.

S203, if the behavior type to which the behavior of the target object belongs satisfies a first behavior type, determining the behavior of the target object based on a result of performing behavior recognition on a second preset behavior for the sequence of image blocks.

The process of performing behavior recognition on the second preset behavior for the sequence of image blocks in the present disclosure may be performed when it is determined that the behavior type to which the behavior of the target object belongs satisfies the first behavior type. In other words, determining that the behavior type to which the behavior of the target object belongs satisfies the first behavior type may be a triggering condition for performing behavior recognition on the second preset behavior for the sequence of image blocks.

The process of performing behavior recognition on the second preset behavior for the sequence of image blocks in the present disclosure may also be performed in parallel with S202. In other words, regardless whether the behavior type to which the behavior of the target object belongs satisfies the first behavior type, according to the present disclosure, behavior recognition may be performed on the second preset behavior for the sequence of image blocks while determining the behavior type to which the behavior of the target object belongs based on the first feature vector. That is to say, determining that the behavior type to which the behavior of the target object belongs satisfies the first behavior type is no longer a triggering condition for performing behavior recognition on the second preset behavior for the sequence of image blocks.

Figure 3A:
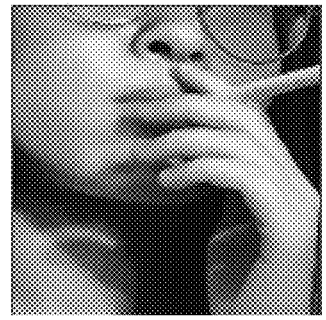
FIG. 3A and FIG. 3B are schematic diagrams of a first preset behavior and a second preset behavior according to an embodiment of the present disclosure.
Figure 3B:
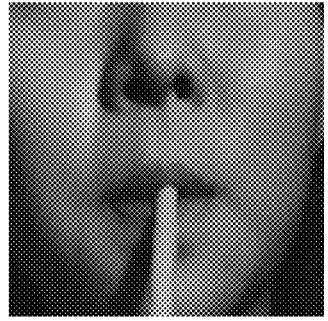

The second preset behavior in the present disclosure may refer to a behavior similar to a particular behavior included in the first preset behaviors. In an example, when the first preset behaviors include a smoking behavior (as shown in FIG. 3A), the second preset behavior may include a behavior similar to the smoking behavior, for example, a behavior of using a straw (as shown in FIG. 3B). In another example, when the first preset behavior includes a call-making behavior, the second preset behavior may include a behavior similar to the call-making behavior, for example, a behavior of using an instant message. Specific manifestations of the first preset behavior and second preset behavior are not limited in present disclosure.

According to the present disclosure, the process of performing behavior recognition on the second preset behavior for the sequence of image blocks may be basically the same as a process of performing behavior recognition on the first preset behavior for the sequence of image blocks. For example, according to the present disclosure, feature vector extraction that is based on the second preset behavior may be performed to the sequence of image blocks, to obtain a second feature vector corresponding to the sequence of image blocks; and whether the behavior of the target object is a second preset behavior may be determined based on the second feature vector. Subsequently, according to the present disclosure, the behavior of the target object is finally determined based on a determining result.

According to the present disclosure, by extracting the image blocks containing the target part of the target object such as a driver or a passenger in the mobile device from the video frames obtained by the camera apparatus disposed in the mobile device, and obtaining the first feature vector from the sequence of image blocks, the behavior type to which the behavior of the target object belongs may be obtained based on the first feature vector. When the behavior type to which the behavior of the target object belongs satisfies the first behavior type (for example, a suspected behavior type), according to the present disclosure, the behavior of the target object may be determined based on the result of performing behavior recognition on the second preset behavior for the sequence of image blocks. Therefore, according to the present disclosure, cascaded recognition of the behavior of the target object is realized, thereby helping to avoid influence on accuracy of behavior recognition caused by that a threshold for behavior recognition is set too high or too low. In view of the above, the technical solutions provided in the present disclosure are helpful for improving the accuracy of behavior recognition. Moreover, driving safety of the mobile device is improved by taking corresponding measures such as voice prompts, light prompts, or vibration prompts for a recognized behavior (such as a dangerous driving behavior or a hazardous driving behavior that affects driving of the driver) of the target object.

Optionally, the second neural network in the present disclosure may include a VargNet (a variable group network). In an example, the VargNet may be a neural network formed by connecting at least two blocks, wherein the two blocks may be a normal block and a downsampling block, respectively.

Figure 4:
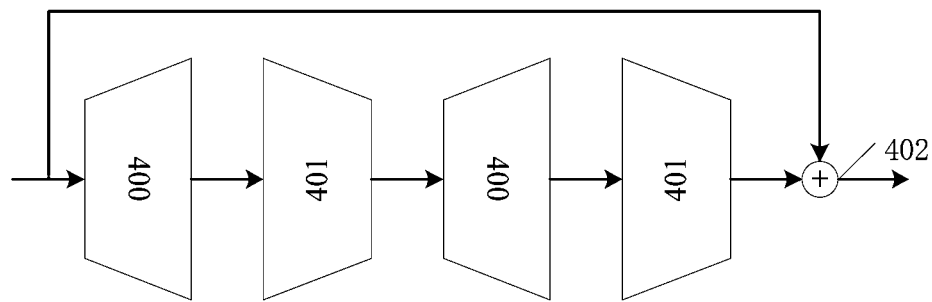
FIG. 4 is a schematic structural diagram of a normal block according to an embodiment of the present disclosure.

Optionally, the normal block may include at least two first units connected in series. Moreover, the first unit includes a variable group cony layer (which may also be referred to as a variable group convolutional layer) and a first convolutional layer (for example, a 1×1 point-by-point convolutional layer). A channel dimension of input data of the first convolutional layer is twice of a channel dimension of output data. An example in which the normal block includes two first units connected in series is shown in FIG. 4. 400 in FIG. 4 represents a variable group convolutional layer (where a channel dimension for output is twice of that for input), and 401 represents a first convolutional layer. Output of a last unit in the normal block may be fused with input of the normal block (402 in FIG. 4), to form output of the normal block.

Figure 5:
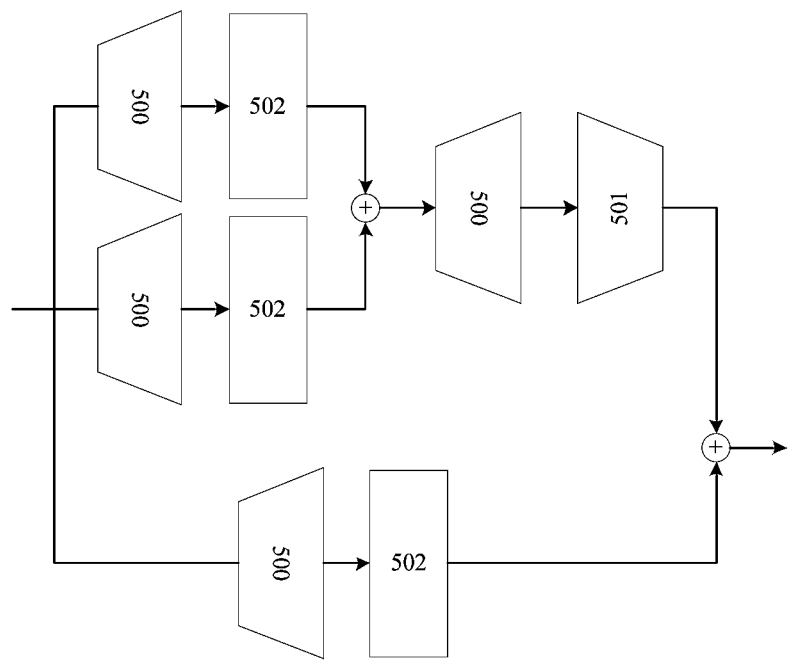
FIG. 5 is a schematic structural diagram of a downsampling block according to an embodiment of the present disclosure.

Optionally, the downsampling block may include at least one first unit and at least one second unit. The first unit may include a variable group convolutional layer and a first convolutional layer, wherein a channel dimension of input data of the first convolutional layer is twice of a channel dimension of output data. The second unit may include a variable group convolutional layer and a second convolutional layer (for example, a point-by-point convolutional layer). A channel dimension of input data of the second convolutional layer may be the same as a channel dimension of output data. The downsampling block is formed by all first units and second units in a manner of combining serial and parallel connection. An example of the downsampling block is shown in FIG. 5. 500 in FIG. 5 represents a variable group convolutional layer; 501 represents a first convolutional layer; and 502 represents a second convolutional layer.

Figure 6:
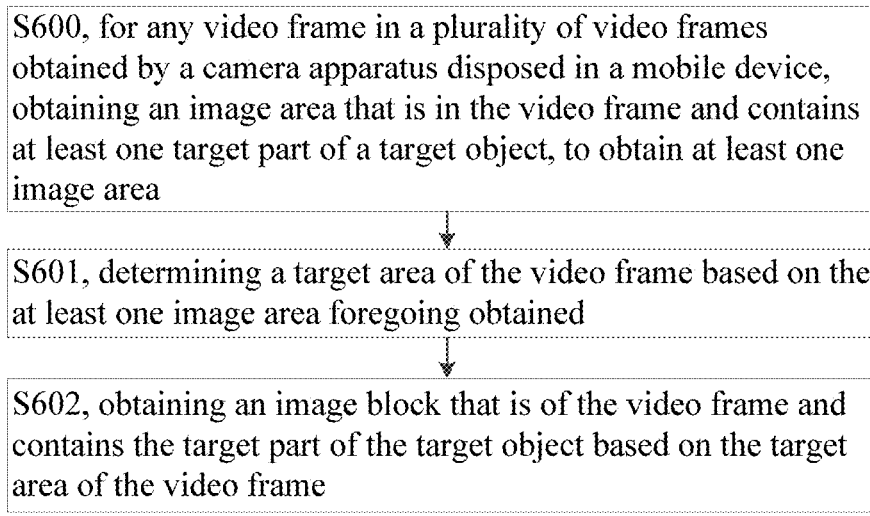
FIG. 6 is a flowchart of obtaining a sequence of image blocks containing a target part of a target object according to an embodiment of the present disclosure.
Figure 7:
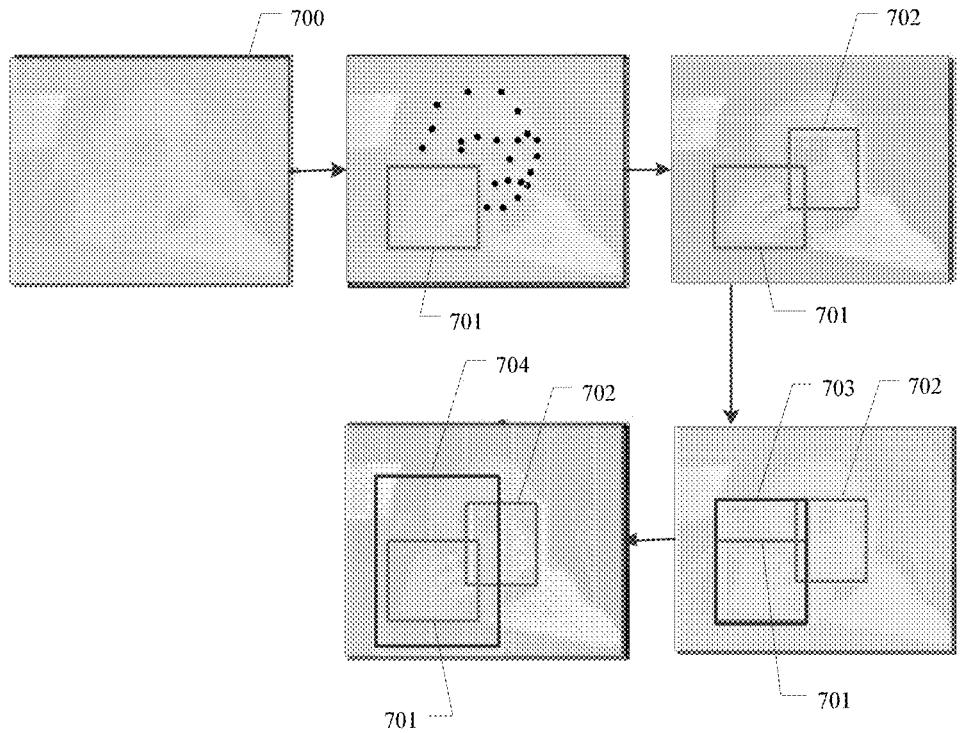
FIG. 7 is a schematic diagram of obtaining a sequence of image blocks containing a target part of a target object according to an embodiment of the present disclosure.

In an optional example, an example of obtaining the sequence of image blocks containing the target part of the target object according to the present disclosure is shown in FIG. 6 and FIG. 7.

In FIG. 6, S600, for any video frame in the plurality of video frames obtained by the camera apparatus disposed in the mobile device, obtaining an image area that is in the video frame and contains at least one target part of the target object, to obtain at least one image area.

Optionally, for any video frame (for example, a video frame 700 in FIG. 7), according to the present disclosure, at least one image area of the video frame may be obtained through key-point recognition. For example, according to the present disclosure, an image area (for example, an area 701, that is, an ROI in FIG. 7) of a hand portion of the target object in the video frame may be obtained through bone key-point recognition. Moreover, according to the present disclosure, an image area (for example, an area 702, that is, another ROI in FIG. 7, wherein FIG. 7 merely exemplarily shows a few face key points) of a face portion of the target object in the video frame may be obtained through face key-point recognition. In this way, two image areas, that is, two ROIs, are obtained.

In an example, according to the present disclosure, operations may be successively performed on various video frames through the first neural network, and ROIs in the various video frames may be successively obtained according to an operation result of the first neural network.

In another example, according to the present disclosure, operations may be performed in parallel on various video frames through a plurality of first neural networks, and ROIs in the various video frames may be obtained in parallel according to operation results of the plurality of first neural networks.

S601, determining a target area of the video frame based on the at least one obtained image area.

Optionally, according to the present disclosure, a target area of a video frame may be obtained based on a coordinate value of each vertex of each image area in the video frame.

In an example, if n1 (n1 is an integer larger than 1) image areas are obtained from a video frame, and the n1 image areas have intersections, according to the present disclosure, a maximum coordinate value and a minimum coordinate value of all vertices of the n1 image areas in a height direction may be taken, and a minimum coordinate value/maximum coordinate value of all vertices of the n1 image areas in a length direction and a maximum coordinate value/minimum coordinate value in an intersection area may be taken, so as to form coordinate values of four points. An area defined by the coordinate values of the four points is a target area of the video frame, such as a target area 703 in FIG. 7.

In another example, if only one image area is obtained from a video frame, according to the present disclosure, this image area may be taken as a target area of the video frame.

In yet another example, if n1 image areas are obtained from a video frame, and the n1 image areas have no intersection, according to the present disclosure, a maximum coordinate value and a minimum coordinate value of all vertices of the n1 image areas in a height direction may be taken, and a maximum coordinate value and a minimum coordinate value of all vertices of the n1 image areas in a length direction may be taken, so as to form coordinate values of four points. An area defined by the coordinate values of the four points is a target area of the video frame.

A specific implementation of obtaining the target area of the video frame is not limited in the present disclosure.

S602, obtaining an image block that is of the video frame and contains the target part of the target object based on the target area of the video frame.

Optionally, for a video frame, according to the present disclosure, a target area of the video frame may be directly cropped from the video frame, so as to obtain an image block that is of the video frame and contains the target part of the target object. According to the present disclosure, the target area of the video frame may also be expanded. For example, the length and the width of the target area of the video frame are respectively expanded by n2 (n2 is an integer larger than 1, for example, n2 is an even number such as 10) pixels to obtain an expanded target area, and the expanded target area is cropped from the video frame, so as to obtain the image block that is of the video frame and contains the target part of the target object.

According to the present disclosure, the target area of the video frame is formed by using the image area that is in the video frame and contains at least one target part of the target object, and the image block containing the target part of the target object is finally formed. In this way, a sequence of image blocks may be conveniently generated for a complex action involving a plurality of parts, thereby helping to improve usability of behavior recognition.

In an optional example, according to the present disclosure, an example of determining the behavior type to which the behavior of the target object belongs based on the first feature vector is shown in FIG. 8.

In FIG. 8, S800, for any image block in the sequence of image blocks, determining, based on the first feature vector of the image block, confidences that a behavior of the target object is each of a plurality of first preset behaviors, to obtain a plurality of first confidences.

Optionally, according to the present disclosure, operation may be respectively performed on the first feature vector of each image block by using the third neural network used for behavior classification, and a plurality of confidences corresponding to each image block may be obtained based on an operation result of the third neural network. For example, the first preset behavior includes n3 (n3 is an integer larger than 1) behaviors (that is, there are n3 first preset behaviors, for example, a smoking behavior, a suspected smoking behavior, and a non-smoking behavior). According to the present disclosure, n3 confidences corresponding to each image block may be obtained based on the operation result of the third neural network, and the n3 confidences corresponding to each image block are a set of confidences. The third neural network in the present disclosure is usually trained together with the second neural network.

Optionally, according to the present disclosure, at least one first preset behavior in the plurality of first preset behaviors belongs to the first behavior type, and at least one first preset behavior in the plurality of first preset behaviors belongs to the second behavior type. In an example, when a quantity of the plurality of first preset behaviors is 3, and the three first preset behaviors respectively are a smoking behavior, a suspected smoking behavior, and a non-smoking behavior, the suspected smoking behavior belongs to the first behavior type, and the smoking behavior and the non-smoking behavior belong to the second behavior type. In another example, when a quantity of the plurality of first preset behaviors is 3, and the three first preset behaviors respectively are a call-making behavior, a suspected call-making behavior, and a non-call-making behavior, the suspected call-making behavior belongs to the first behavior type, and the call-making behavior and the non-call-making behavior belong to the second behavior type.

S801, determining the behavior type to which the behavior of the target object belongs based on the plurality of first confidences respectively corresponding to each image block in the sequence of image blocks and a first threshold corresponding to the first preset behavior.

Optionally, according to the present disclosure, the plurality of confidences respectively corresponding to each image block may be calculated, so as to obtain a plurality of confidences (for example, n3 confidences) corresponding to the sequence of image blocks. According to the present disclosure, whether a magnitude relationship between the plurality of confidences corresponding to the sequence of image blocks and the first threshold satisfies a predetermined condition may be determined, and the behavior of the target object in a plurality of video frames is determined based on a determining result, so as to determine the behavior type to which the behavior of the target object belongs.

In an example, according to the present disclosure, an average value may be calculated for the first confidences (for example, n4 first confidences) of a same first preset behavior among the plurality of first confidences (for example, n4×n3 first confidences, where n4 is an integer larger than 1, and n4 is a quantity of image blocks included in the sequence of image blocks) respectively corresponding to each image block in the sequence of image blocks, to obtain first confidence average values (for example, n3 first confidence average values) respectively corresponding to various first preset behaviors. Subsequently, according to the present disclosure, the behavior of the target object is determined based on the first confidence average values respectively corresponding to various first preset behaviors (for example, n3 first preset behaviors) and the first thresholds respectively corresponding to the plurality of first preset behaviors, so as to obtain the behavior type to which the behavior of the target object belongs.

More specifically, for any first preset behavior, an average value of first confidences of all first preset behaviors among the plurality of first confidences respectively corresponding to each image block is calculated to obtain a first confidence average value of the first preset behavior. The first confidence average value represents a probability that the behavior of the target object in the plurality of video frames belongs to the first preset behavior. After the first confidence average value is respectively calculated for every first preset behavior, according to the present disclosure, a first confidence average value with a highest value may be selected from all the first confidence average values (for example, n3 first confidence average values), and whether a magnitude relationship between the first confidence average value with the highest value and one first threshold (for example, 0.75 or 0.7) satisfies a predetermined condition may be determined (for example, whether the first confidence average value with the highest value reaches a first threshold corresponding to a first preset behavior corresponding to the first confidence average value with the highest value is determined). If the predetermined condition is satisfied, it is determined that the behavior of the target object in the plurality of video frames is the first preset behavior corresponding to the first confidence average value with the highest value. If the predetermined condition is not satisfied, whether a magnitude relationship between a first confidence average value with a second-highest value and another first threshold satisfies the predetermined condition may be determined (for example, whether the first confidence average value with the second-highest value reaches a first threshold corresponding to a first preset behavior which is corresponding to the first confidence average value with the second-highest value is determined). If the predetermined condition is satisfied, it is determined that the behavior of the target object in the plurality of video frames is the first preset behavior corresponding to the first confidence average value with the second-highest value. The others may be done in the same way. If all magnitude relationships between all first confidence average values and the corresponding first thresholds do not satisfy the predetermined condition, the behavior of the target object in the plurality of video frames is not successfully recognized this time.

In another example, according to the present disclosure, based on a weighted value respectively corresponding to each image block in the sequence of image blocks (that is, a weighted value respectively corresponding to each video frame), an average weighted value may be respectively calculated for the first confidences (for example, n4 confidences) of a same first preset behavior among the plurality of first confidences (for example, n4×n3 first confidences, where n4 is an integer larger than 1, and n4 is a quantity of image blocks included in the sequence of image blocks) respectively corresponding to each image block in the sequence of image blocks, to obtain first confidence weighted values (n3 first confidence weighted values in total) respectively corresponding to various first preset behaviors. Subsequently, according to the present disclosure, the behavior of the target object is determined based on the first confidence weighted values respectively corresponding to various first preset behaviors (for example, n3 first preset behaviors) and the first thresholds respectively corresponding to the plurality of first preset behaviors, so as to obtain the behavior type to which the behavior of the target object belongs.

More specifically, for any first preset behavior, an average weighted value of first confidences of all first preset behaviors among the plurality of first confidences respectively corresponding to each image block is calculated to obtain a first confidence weighted value of the first preset behavior. The first confidence weighted value represents a probability that the behavior of the target object in the plurality of video frames belongs to the first preset behavior. After the weighted average value is respectively calculated for the first confidence of every first preset behavior, according to the present disclosure, a first confidence weighted value with a highest value may be selected from all the first confidence weighted values (for example, n3 first confidence weighted values), and whether a magnitude relationship between the first confidence weighted value with the highest value and a first threshold (for example, 0.75 or 0.7) satisfies a predetermined condition may be determined (for example, whether the first confidence weighted value with the highest value reaches a first threshold corresponding to a first preset behavior which is corresponding to the first confidence weighted value with the highest value is determined). If the predetermined condition is satisfied, it is determined that the behavior of the target object in the plurality of video frames is the first preset behavior corresponding to the first confidence weighted value with the highest value. If the predetermined condition is not satisfied, whether a magnitude relationship between a first confidence weighted value with a second-highest value and another first threshold satisfies the predetermined condition may be determined (for example, whether the first confidence weighted value with the second-highest value reaches a first threshold corresponding to a first preset behavior which is corresponding to the first confidence weighted value with the second-highest value is determined). If the predetermined condition is satisfied, it is determined that the behavior of the target object in the plurality of video frames is the first preset behavior corresponding to the first confidence weighted value with the second-highest value. The others may be done in the same way. If all magnitude relationships between all first confidence weighted values and the corresponding first thresholds do not satisfy the predetermined condition, the behavior of the target object in the plurality of video frames is not successfully recognized this time.

Optionally, a weight value corresponding to each video frame may be set according to acquisition time of each video frame. For example, the weight value corresponding to the video frame with earlier acquisition time is not smaller than the weight value corresponding to the video frame with later acquisition time. A human behavior is sometimes relatively intense in an initial stage, and gradually becomes moderate in a subsequent stage. Therefore, according to the present disclosure, setting the weight value respectively corresponding to each video frame according to the acquisition time of each video frame is actually setting the weight value respectively corresponding to each video frame based on decay of the behavior over time, thereby helping to improve accuracy of the finally determined confidence respectively corresponding to each first preset behavior in the present disclosure. In addition, when setting the weight value respectively corresponding to each video frame, factors such as image definition of the video frame and degree at which the face of the target object in the video frame returns may also be considered, so as to help to prevent accuracy of a plurality of finally determined first confidences respectively corresponding to each first preset behavior from being affected by a video frame with poor definition or the face that returns at a large angle.

According to the present disclosure, determining the behavior of the target object in the plurality of video frames by using a plurality of confidences respectively corresponding to a plurality of image blocks may achieve smooth processing for the behavior of the target object in the plurality of video frames. In this way, inaccuracy in determining the behavior of the target object by using a single video frame may be avoided, and hopping of behavior recognition may be further avoided, thereby helping to improve accuracy of behavior recognition for the target object.

In an optional example, if the behavior type to which the behavior of the target object belongs satisfies the second behavior type, according to the present disclosure, the first preset behavior corresponding to the first confidence (for example, the first confidence average value or the first confidence weighted value) of which the magnitude relationship with the first threshold satisfies the predetermined condition may be taken as the behavior of the target object. In other words, if a magnitude relationship between a first confidence of a first preset behavior that belongs to the second behavior type and a first threshold corresponding to the first preset behavior satisfies the predetermined condition, it may be recognized that the behavior of the target object is the first preset behavior.

Optionally, the second behavior type in the present disclosure may refer to a type that can be determined with certainty that the behavior of the target object is a particular behavior (a behavior that needs to be recognized, such as a dangerous behavior). The second behavior type may be referred to as a type of determined predetermined behaviors (such as a type of determined dangerous behaviors). Usually, the second behavior type in the present disclosure may include a plurality of first preset behaviors. For example, the second behavior type may include a smoking behavior and a non-smoking behavior. For another example, the second behavior type may include a call-making behavior and a non-call-making behavior.

For a more specific example, it is assumed that there are three first preset behaviors, which respectively are a smoking behavior, a suspected smoking behavior, and a non-smoking behavior, wherein the smoking behavior and the non-smoking behavior belong to the second behavior type. If three confidences finally obtained for the foregoing three first preset behaviors according to the present disclosure respectively are 0.8, 0.1, and 0.1, because 0.8 reaches a first threshold (for example, 0.75 or 0.7) corresponding to the smoking behavior, according to the present disclosure, it may be determined that the behavior of the target object in the plurality of video frames is a smoking behavior.

According to the technical solutions provided in the present disclosure, a first threshold of a particular behavior that needs to be recognized, such as a smoking behavior or a call-making behavior, may be set slightly high, so that a false positive of a particular behavior that needs to be recognized, such as a dangerous behavior, may be avoided as possible. According to the present disclosure, a cascade behavior-recognition manner is adopted in a process of recognizing the behavior of the target object, and the cascade behavior-recognition manner may compensate for missed recognition of a particular behavior caused by the first threshold that is set slightly high. Therefore, according to the present disclosure, difficulty of setting the threshold is effectively reduced, thereby helping to improve usability of behavior recognition.

In an optional example, according to the present disclosure, an example of determining the behavior of the target object based on a result of performing behavior recognition on the second preset behavior for the sequence of image blocks is shown in FIG. 9.

In FIG. 9, S900, performing feature vector extraction that is based on the second preset behavior to the sequence of image blocks, to obtain a second feature vector corresponding to the sequence of image blocks.

Optionally, according to the present disclosure, the feature vector extraction that is based on the second preset behavior is a manner for extracting a feature vector, which is set for a purpose of recognizing the second preset behavior. For example, according to the present disclosure, the feature vector extraction may be realized by using a neural network. According to the present disclosure, the neural network may be trained by using training samples with annotation information of the second preset behavior, and a network parameter of the neural network is obtained after the neural network is successfully trained. Feature vector extraction performed by the neural network using the network parameter is the feature vector extraction that is based on the second preset behavior.

According to the present disclosure, an example of a process of performing feature vector extraction that is based on the second preset behavior to the sequence of image blocks by using the neural network may be: performing operation on each image block in the sequence of image blocks by using a fourth neural network used for feature extraction, and obtaining a respective feature vector (for example, a one-dimensional array formed by a plurality of vector elements used to describe features of the target part) of each image block in the sequence of image blocks based on an operation result of the fourth neural network. Feature vectors of all image blocks are the second feature vector corresponding to the sequence of image blocks.

The fourth neural network in the present disclosure may be a convolutional neural network or the like. For example, the fourth neural network may also include a VargNet. The fourth neural network and the second neural network may have a same network structure, but usually have different network parameters. According to the present disclosure, feature vectors of all image blocks may be obtained by using one fourth neural network or by using a plurality of fourth neural networks. The plurality of fourth neural networks usually have a same network structure and a same network parameter.

S901, for any image block in the sequence of image blocks, determining, based on the second feature vector of the image block, confidences that the behavior of the target object is each of at least two second preset behaviors, to obtain at least two second confidences.

Optionally, according to the present disclosure, operation may be respectively performed on the first feature vector of each image block by using a fifth neural network used for behavior classification, and a plurality of second confidences corresponding to each image block may be obtained based on an operation result of the fifth neural network. For example, the second preset behaviors include n5 (n5 is an integer larger than 1) behaviors (that is, there are n5 second preset behaviors, for example, two second preset behaviors including a behavior of using a straw and a behavior of not using a straw; for another example, two second preset behaviors including a behavior of using an instant message and a behavior of not using an instant message). n5 second confidences corresponding to each image block are a set of second confidences.

Optionally, the fifth neural network and the third neural network may have the same network structure, but usually have different network parameters. The fifth neural network and the third neural network usually both include at least one layer for classification (such as a fully-connected layer). In addition, the fifth neural network is usually trained together with the fourth neural network.

In an optional example, for any image block, the present disclosure may not only use the second feature vector of the image block to determine the second confidences that the behavior of the target object is at least two second preset behaviors respectively, but also use the second feature vector of the image block and the first confidence (for example, the first confidence corresponding to the image block, and for another example, the first confidence corresponding to the sequence of image blocks), to determine confidences that the behavior of the target object is each of at least two second preset behaviors.

In an example, first, for any image block in the sequence of image blocks, according to the present disclosure, a plurality of first confidences corresponding to the image block may be fused with the second feature vector of the image block (for example, the plurality of first confidences corresponding to the image block are encoded by using an encoder, and an encoding result is spliced with the second feature vector), so as to obtain a fusion feature vector of the image block. Second, according to the present disclosure, operation may be respectively performed on the fusion feature vector of each image block by using the fifth neural network, and based on an operation result of the fifth neural network, confidences that the behavior of the target object in each image block is each of at least two second preset behaviors may be obtained. In other words, at least two confidences corresponding to each image block respectively may be obtained.

In another example, first, according to the present disclosure, a plurality of first confidences corresponding to the sequence of image blocks may be respectively fused with the second feature vector of each image block in the sequence of image blocks (for example, the plurality of first confidences corresponding to the sequence of image blocks are encoded by using an encoder, and an encoding result is spliced with the second feature vector of each image block), so as to obtain a fusion feature vector of each image block. Second, according to the present disclosure, operation may be respectively performed on the fusion feature vector of each image block by using the fifth neural network, and based on an operation result of the fifth neural network, confidences that the behavior of the target object in each image block is each of at least two second preset behaviors may be obtained. In other words, at least two confidences corresponding to each image block respectively may be obtained.

According to the present disclosure, by fusing the first confidence and the second feature vector, more comprehensive information is obtained in an operation process of the fifth neural network, thereby helping to improve accuracy of the operation result of the fifth neural network. In other words, this is helpful for improving accuracy of behavior classification.

S902, determining the behavior of the target object based on the at least two second confidences respectively corresponding to each image block in the sequence of image blocks and second thresholds respectively corresponding to the at least two second preset behaviors.

Optionally, according to the present disclosure, the plurality of second confidences respectively corresponding to each image block may be calculated, so as to obtain a plurality of second confidences (for example, n5 confidences) corresponding to the sequence of image blocks. According to the present disclosure, whether a magnitude relationship between the plurality of second confidences corresponding to the sequence of image blocks and the second threshold satisfies a predetermined condition may be determined, and the behavior of the target object in a plurality of video frames may be determined based on a determining result. For example, assuming that the second preset behaviors include a first behavior (for example, a behavior of using a straw or a behavior of using an instant message) and a second behavior (for example, a behavior of not using a straw or a behavior of not using an instant message), if at least two second confidences respectively corresponding to each image block in the sequence of image blocks and a second threshold corresponding to the first behavior in the plurality of second preset behaviors satisfy a first predetermined condition, it is determined that the behavior of the target object is the first behavior. If at least two second confidences respectively corresponding to each image block in the sequence of image blocks and a second threshold corresponding to the second behavior in the plurality of second preset behaviors satisfy a second predetermined condition, it is determined that the behavior of the target object is a particular behavior, for example, a smoking behavior or a call-making behavior, in the plurality of first preset behaviors.

According to the present disclosure, when it is recognized that the behavior of the target object is not a first behavior, it may be clearly learned that the behavior of the target object is not a suspected particular behavior (for example, a suspected smoking behavior or a suspected call-making behavior). In this case, the behavior of the target object is most likely to be a particular behavior (for example, a smoking behavior or a call-making behavior) in the first preset behaviors. Therefore, according to the present disclosure, determining the behavior of the target object through a result of second stage of behavior recognition helps to improve the accuracy of behavior recognition.

In an example, according to the present disclosure, an average value may be calculated for the second confidences (for example, n4 second confidences) of a same second preset behavior among the plurality of second confidences (for example, n5×n4 second confidences, where n5 is an integer larger than 1, and n4 is a quantity of image blocks included in the sequence of image blocks) respectively corresponding to each image block in the sequence of image blocks, to obtain second confidence average values (for example, n5 second confidence average values) respectively corresponding to various second preset behaviors. Subsequently, according to the present disclosure, the behavior of the target object is determined based on the second confidence average values respectively corresponding to various second preset behaviors (for example, n5 second preset behaviors) and the second thresholds respectively corresponding to the plurality of second preset behaviors.

More specifically, for any second preset behavior, an average value of second confidences of all second preset behaviors among the plurality of second confidences respectively corresponding to each image block is calculated to obtain a second confidence average value of the second preset behavior. The second confidence average value represents a probability that the behavior of the target object in the plurality of video frames belongs to the second preset behavior. After the second confidence average value is respectively calculated for every second preset behavior, according to the present disclosure, a second confidence average value with a highest value may be selected from all the second confidence average values (for example, n5 second confidence average values), and whether a magnitude relationship between the second confidence average value with the highest value and a second threshold (for example, 0.75 or 0.7) satisfies a predetermined condition may be determined (for example, whether the second confidence average value with the highest value reaches a second threshold corresponding to a second preset behavior which is corresponding to the second confidence average value with the highest value is determined). If the predetermined condition is satisfied, it is determined that the behavior of the target object in the plurality of video frames is the second preset behavior corresponding to the second confidence average value with the highest value. If the predetermined condition is not satisfied, whether a magnitude relationship between a second confidence average value with a second-highest value and another second threshold satisfies the predetermined condition may be determined (for example, whether the second confidence average value with the second-highest value reaches a second threshold corresponding to a second preset behavior which is corresponding to the second confidence average value with the second-highest value is determined). If the predetermined condition is satisfied, it is determined that the behavior of the target object in the plurality of video frames is the second preset behavior corresponding to the second confidence average value with the second-highest value. The others may be done in the same way. If all magnitude relationships between all second confidence average values and the corresponding second thresholds do not satisfy the predetermined condition, the behavior of the target object in the plurality of video frames is not successfully recognized this time.

In another example, according to the present disclosure, based on a weight value respectively corresponding to each image block in the sequence of image blocks (that is, a weight value respectively corresponding to each video frame), an weighted average value may be respectively calculated for the second confidences (for example, n4 second confidences) of a same second preset behavior among the plurality of second confidences (for example, n5×n4 second confidences, where n5 is an integer larger than 1, and n4 is a quantity of image blocks included in the sequence of image blocks) respectively corresponding to each image block in the sequence of image blocks, to obtain second confidence weighted values (n3 second confidence weighted values in total) respectively corresponding to various second preset behaviors. Subsequently, according to the present disclosure, the behavior of the target object is determined based on the second confidence weighted values respectively corresponding to various second preset behaviors (for example, n5 second preset behaviors) and the second thresholds respectively corresponding to the various second preset behaviors.

More specifically, for any second preset behavior, an weighted average value of second confidences of all second preset behaviors among the plurality of second confidences respectively corresponding to each image block is calculated to obtain a second confidence weighted value of the second preset behavior. The second confidence weighted value represents a probability that the behavior of the target object in the plurality of video frames belongs to the second preset behavior. After the average weighted value is respectively calculated for the second confidence of every second preset behavior, according to the present disclosure, a second confidence weighted value with a highest value may be selected from all the second confidence weighted values (for example, n5 second confidence weighted values), and whether a magnitude relationship between the second confidence weighted value with the highest value and a second threshold (for example, 0.75 or 0.7) satisfies a predetermined condition may be determined (for example, whether the second confidence weighted value with the highest value reaches a second threshold corresponding to a second preset behavior which is corresponding to the second confidence weighted value with the highest value is determined). If the predetermined condition is satisfied, it is determined that the behavior of the target object in the plurality of video frames is the second preset behavior corresponding to the second confidence weighted value with the highest value. If the predetermined condition is not satisfied, whether a magnitude relationship between a second confidence weighted value with a second-highest value and another second threshold satisfies the predetermined condition may be determined (for example, whether the second confidence weighted value with the second-highest value reaches a second threshold corresponding to a second preset behavior which is corresponding to the second confidence weighted value with the second-highest value is determined). If the predetermined condition is satisfied, it is determined that the behavior of the target object in the plurality of video frames is the second preset behavior corresponding to the second confidence weighted value with the second-highest value. The others may be deduced by analogy. If all magnitude relationships between all second confidence weighted values and the corresponding second thresholds do not satisfy the predetermined condition, the behavior of the target object in the plurality of video frames is not successfully recognized this time. For a manner of setting the respective weight value corresponding to each video frame, reference may be made to the relevant description in the foregoing embodiment, and details are not described herein again.

According to the present disclosure, determining the behavior of the target object in the plurality of video frames by using a plurality of second confidences respectively corresponding to a plurality of image blocks may achieve smooth processing for the behavior of the target object in the plurality of video frames. In this way, inaccuracy in determining the behavior of the target object by using a single video frame may be avoided, and hopping of behavior recognition may be further avoided, thereby helping to improve accuracy of the behavior recognition.

Exemplary Apparatus

Figure 10:
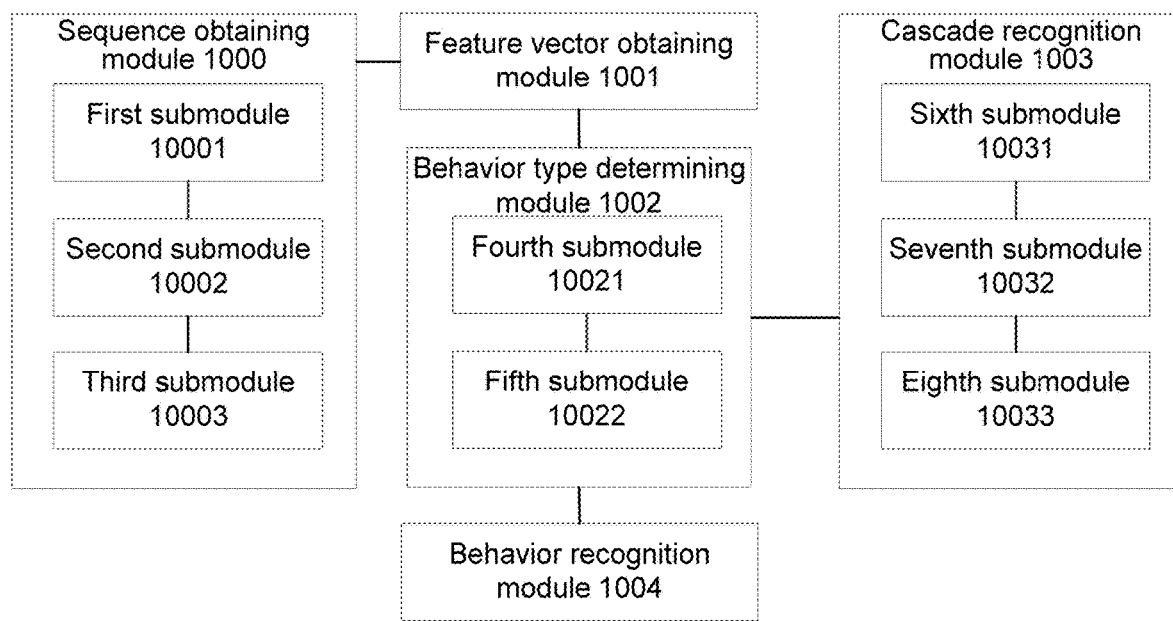
FIG. 10 is a schematic structural diagram of a behavior recognition apparatus according to an embodiment of the present disclosure.

FIG. 10 is a schematic structural diagram of a behavior recognition apparatus according to an embodiment of the present disclosure. The apparatus in this embodiment may be configured to implement the corresponding method embodiments of the present disclosure.

The apparatus shown in FIG. 10 includes a sequence obtaining module 1000, a feature vector obtaining module 1001, a behavior type determining module 1002, and a cascade recognition module 1003. Optionally, the apparatus may further include a behavior recognition module 1004.

The sequence obtaining module 1000 is configured to obtain a sequence of image blocks containing a target part of a target object from a plurality of video frames obtained by a camera apparatus disposed in a mobile device.

The feature vector obtaining module 1001 is configured to perform feature vector extraction that is based on a first preset behavior to the sequence of image blocks obtained by the sequence obtaining module 10000, to obtain a first feature vector corresponding to the sequence of image blocks.

The behavior type determining module 1002 is configured to determine a behavior type to which a behavior of the target object belongs based on the first feature vector obtained by the feature vector obtaining module 1001.

The cascade recognition module 1003 is configured to determine the behavior of the target object based on a result of performing behavior recognition on a second preset behavior for the sequence of image blocks if the behavior type, determined by the behavior type determining module 1002, to which the behavior of the target object belongs satisfies a first behavior type.

Optionally, the sequence obtaining module 1000 may include a first submodule 10001, a second submodule 10002, and a third submodule 10003. The first submodule 10001 is configured to obtain, for any video frame in the plurality of video frames obtained by the camera apparatus disposed in the mobile device, an image area that is in the video frame and contains at least one target part of the target object, to obtain at least one image area. The second submodule 10002 is configured to determine a target area of the video frame based on the at least one image area obtained by the first submodule 10001. The third submodule 10003 is configured to obtain an image block that is of the video frame and contains the target part of the target object based on the target area that is of the video frame and is determined by the second submodule 10002.

Optionally, the behavior type determining module 1002 may include a fourth submodule 10021 and a fifth submodule 10022. The fourth submodule 10021 may be configured to determine, for any image block in the sequence of image blocks based on the first feature vector that is of the image block and is obtained by the feature vector obtaining module 1001, confidences that the behavior of the target object is each of a plurality of first preset behaviors, to obtain a plurality of first confidences. The fifth submodule 10022 is configured to determine the behavior type to which the behavior of the target object belongs based on the plurality of first confidences respectively corresponding to each image block in the sequence of image blocks and first thresholds corresponding to the plurality of first preset behaviors. At least one first preset behavior in the plurality of first preset behaviors belongs to the first behavior type, and at least one first preset behavior in the plurality of first preset behaviors belongs to a second behavior type.

Optionally, the fifth submodule 10022 may be further configured to calculate an average value for the first confidences of the same first preset behavior among the plurality of first confidences respectively corresponding to each image block in the sequence of image blocks, to obtain first confidence average values respectively corresponding to the plurality of first preset behaviors; and determine the behavior type to which the behavior of the target object belongs based on the first confidence average values respectively corresponding to the plurality of first preset behaviors and the first thresholds respectively corresponding to the plurality of first preset behaviors.

Optionally, the fifth submodule 10022 may be further configured to calculate, based on a weight value respectively corresponding to each image block in the sequence of image blocks, a weighted average value for the first confidences of a same first preset behavior among the plurality of first confidences respectively corresponding to each image block, to obtain first confidence weighted values respectively corresponding to the plurality of first preset behaviors; and determine the behavior type to which the behavior of the target object belongs based on the first confidence weighted values respectively corresponding to the plurality of first preset behaviors and the first thresholds respectively corresponding to the plurality of first preset behaviors. The weight value corresponding to the image block in the video frame that is obtained later is not larger than the weight value corresponding to the image block in the video frame that is obtained previously.

Optionally, the behavior recognition module 1004 is configured to take the first preset behavior corresponding to the first confidence of which a magnitude relationship with the first threshold satisfies a predetermined condition as the behavior of the target object if the behavior type, determined by the behavior type determining module 1002, to which the behavior of the target object belongs satisfies the second behavior type.

Optionally, the cascade recognition module 1003 includes a sixth submodule 10031, a seventh submodule 10032, and an eighth submodule 10033. The sixth submodule 10031 is configured to perform feature vector extraction that is based on the second preset behavior to the sequence of image blocks, to obtain a second feature vector corresponding to the sequence of image blocks. The seventh submodule 10032 is configured to determine, for any image block in the sequence of image blocks based on the second feature vector of the image block, confidences that the behavior of the target object is each of at least two second preset behaviors, to obtain at least two second confidences. The eighth submodule 10033 is configured to determine the behavior of the target object based on the at least two second confidences respectively corresponding to each image block in the sequence of image blocks and second thresholds respectively corresponding to the at least two second preset behaviors.

Optionally, the seventh submodule 10032 is further configured to fuse, for any image block in the sequence of image blocks, a plurality of first confidences corresponding to the image block and the second feature vector of the image block, to obtain a fusion feature vector of the image block; and based on the fusion feature vector of each image block in the sequence of image blocks, determine confidences that the behavior of the target object is each of at least two second preset behaviors respectively, to obtain at least two second confidences.

Optionally, the eighth submodule 10033 is further configured to determine that the behavior of the target object is a first behavior if at least two second confidences respectively corresponding to each image block in the sequence of image blocks and a second threshold corresponding to a first behavior in the plurality of second preset behaviors satisfy a first predetermined condition; and determine that the behavior of the target object is one of the plurality of first preset behaviors if at least two second confidences respectively corresponding to each image block in the sequence of image blocks and a second threshold corresponding to a second behavior in the plurality of second preset behaviors satisfy a second predetermined condition.

Exemplary Electronic Device

Figure 11:
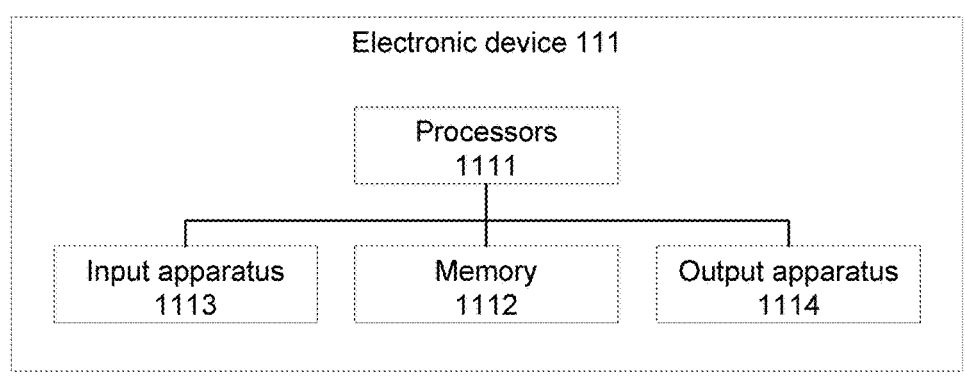
FIG. 11 is a structural diagram of an electronic device according to an exemplary embodiment of the present disclosure.

An electronic device according to an embodiment of the present disclosure is described below with reference to FIG. 11. FIG. 11 shows a block diagram of an electronic device according to an embodiment of the present disclosure. As shown in FIG. 11, an electronic device 111 includes one or more processors 1111 and a memory 1112.

The processor 1111 may be a central processing unit (CPU) or another form of processing unit having a data processing capability and/or an instruction execution capability, and may control another component in the electronic device 111 to perform a desired function.

The memory 1112 may include one or more computer program products. The computer program product may include various forms of computer-readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer-readable storage medium. The program instruction may be executed by the processor 1111, to implement the behavior recognition method according to the foregoing various embodiments of the present disclosure and/or other desired functions. Various contents such as an input signal, a signal component, and a noise component may also be stored in the computer-readable storage medium.

In an example, the electronic device 111 may further include an input apparatus 1113 and an output apparatus 1114. These components are connected with each other through a bus system and/or another form of connection mechanism (not shown). In addition, the input apparatus 1113 may further include, for example, a keyboard and a mouse. The output apparatus 1114 may output various information to the outside. The output apparatus 1114 may include, for example, a display, a loudspeaker, a printer, a communication network, and a remote output device connected by the communication network.

Certainly, for simplicity, FIG. 11 shows only some of components in the electronic device 111 that are related to the present disclosure, and components such as a bus and an input/output interface are omitted. In addition, according to specific application situations, the electronic device 111 may further include any other appropriate components.

Exemplary computer program product and computer-readable storage medium

In addition to the foregoing method and device, the embodiments of the present disclosure may further relate to a computer program product, which includes computer program instructions. When executing the computer program instructions, the processor is enabled to perform the steps, of the behavior recognition method according to the embodiments of the present disclosure, that are described in the "exemplary method" part of this specification.

The computer program product may be program codes, written with one or any combination of a plurality of programming languages, that is configured to perform the operations in the embodiments of the present disclosure. The programming languages include an object-oriented programming language such as Java or C++, and further include a conventional procedural programming language such as a "C" language or a similar programming language. The program codes may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer-readable storage medium, which stores computer program instructions. When executing the computer program instructions, the processor is enabled to perform the steps, of the behavior recognition method according to the embodiments of the present disclosure, that are described in the "exemplary method" part of this specification.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and may be used interchangeably with "including but not limited to". The terms "or" and "and" used herein refer to the term "and/or", and may be used interchangeably with "and/or', unless the context clearly indicates otherwise. The term "such as" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be arrived at or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:
1. A behavior recognition method, including:
  obtaining a sequence of image blocks containing a target part of a target object from a plurality of video frames obtained by a camera apparatus disposed in a mobile device;
  performing feature vector extraction that is based on a first preset behavior to the sequence of image blocks, to obtain a first feature vector corresponding to the sequence of image blocks;
  determining a behavior type to which a behavior of the target object belongs based on the first feature vector; and
  if the behavior type to which the behavior of the target object belongs satisfies a first behavior type, determining the behavior of the target object based on a result of performing behavior recognition on a second preset behavior for the sequence of image block;
  wherein the determining a behavior type to which a behavior of the target object belongs based on the first feature vector includes:
    for any image block in the sequence of image blocks, determining, based on the first feature vector of the image block, confidences that the behavior of the target object is each of a plurality of first preset behaviors, to obtain a plurality of first confidences; and
    determining the behavior type to which the behavior of the target object belongs based on the plurality of first confidences respectively corresponding to each image block in the sequence of image blocks and first thresholds corresponding to the plurality of first preset behaviors;
  wherein at least one first preset behavior in the plurality of first preset behaviors belongs to the first behavior type, and at least one first preset behavior in the plurality of first preset behaviors belongs to a second behavior type and wherein the determining the behavior of the target object based on a result of performing behavior recognition on a second preset behavior for the sequence of image blocks includes:

performing feature vector extraction that is based on the second preset behavior to the sequence of image blocks, to obtain a second feature vector corresponding to the sequence of image blocks;

for any image block in the sequence of image blocks, determining, based on the second feature vector of the image block, confidences that the behavior of the target object is each of at least two second preset behaviors, to obtain at least two second confidences; and the behavior of the target object based on the at least two second confidences respectively corresponding to each image block in the sequence of image blocks and second thresholds respectively corresponding to the at least two second preset behaviors.

2. The method according to claim 1, wherein the obtaining a sequence of image blocks containing a target part of a target object from a plurality of video frames obtained by a camera apparatus disposed in a mobile device includes:

for any video frame in the plurality of video frames obtained by the camera apparatus disposed in the mobile device, obtaining an image area that is in the video frame and contains at least one target part of the target object, to obtain at least one image area;

determining a target area of the video frame based on the at least one image area; and obtaining an image block that is of the video frame and contains the target part of the target object based on the target area of the video frame.

3. The method according to claim 1, wherein the determining the behavior type to which the behavior of the target object belongs based on the plurality of first confidences respectively corresponding to each image block in the sequence of image blocks and first thresholds respectively corresponding to the plurality of first preset behaviors includes:

calculating an average value for the first confidences of a same first preset behavior among the plurality of first confidences respectively corresponding to each image block in the sequence of image blocks, to obtain first confidence average values respectively corresponding to the plurality of first preset behaviors, and determining the behavior type to which the behavior of the target object belongs based on the first confidence average values respectively corresponding to the plurality of first preset behaviors and the first thresholds respectively corresponding to the plurality of first preset behaviors;

or calculating, based on a weight value respectively corresponding to each image block in the sequence of image blocks, a weighted average value for the first confidences of a same first preset behavior among the plurality of first confidences respectively corresponding to the each image block, to obtain first confidence weighted values respectively corresponding to the plurality of first preset behaviors, and determining the behavior type to which the behavior of the target object belongs based on the first confidence weighted values respectively corresponding to the plurality of first preset behaviors and the first thresholds respectively corresponding to the plurality of first preset behaviors, wherein the weight value corresponding to the image block in the video frame that is obtained later is not larger than the weight value corresponding to the image block in the video frame that is obtained previously.

4. The method according to claim 1, wherein the method further includes:

if the behavior type to which the behavior of the target object belongs satisfies the second behavior type, taking the first preset behavior corresponding to the first confidence of which a magnitude relationship with the first threshold satisfies a predetermined condition as the behavior of the target object.

5. The method according to claim 1, wherein the for any image block in the sequence of image blocks, determining, based on the second feature vector of the image block, confidences that the behavior of the target object is each of at least two second preset behaviors, to obtain at least two second confidences includes:

for any image block in the sequence of image blocks, fusing a plurality of first confidences corresponding to the image block and the second feature vector of the image block, to obtain a fusion feature vector of the image block; and based on the fusion feature vector of each image block in the sequence of image blocks, determining the confidences that the behavior of the target object is each of at least two second preset behaviors, to obtain at least two second confidences.

6. A computer-readable non-transitory storage medium, wherein the storage medium stores a computer program used to implement a behavior recognition method including:

obtaining a sequence of image blocks containing a target part of a target object from a plurality of video frames obtained by a camera apparatus disposed in a mobile device;

performing feature vector extraction that is based on a first preset behavior to the sequence of image blocks, to obtain a first feature vector corresponding to the sequence of image blocks;

determining a behavior type to which a behavior of the target object belongs based on the first feature vector; and if the behavior type to which the behavior of the target object belongs satisfies a first behavior type, determining the behavior of the target object based on a result of performing behavior recognition on a second preset behavior for the sequence of image blocks;

wherein the determining a behavior type to which a behavior of the target object belongs based on the first feature vector includes:

for any image block in the sequence of image blocks, determining, based on the first feature vector of the image block, confidences that the behavior of the target object is each of a plurality of first preset behaviors, to obtain a plurality of first confidences; and determining the behavior type to which the behavior of the target object belongs based on the plurality of first confidences respectively corresponding to each image block in the sequence of image blocks and first thresholds corresponding to the plurality of first preset behaviors, wherein at least one first preset behavior in the plurality of first preset behaviors belongs to the first behavior type, and at least one first preset behavior in the plurality of first preset behaviors belongs to a second behavior type and, wherein the determining the behavior of the target object based on a result of performing behavior recognition on a second preset behavior for the sequence of image blocks includes:

performing feature vector extraction that is based on the second preset behavior to the sequence of image blocks, to obtain a second feature vector corresponding to the sequence of image blocks;

for any image block in the sequence of image blocks, determining, based on the second feature vector of the image block, confidences that the behavior of the target object is each of at least two second preset behaviors, to obtain at least two second confidences; and determining the behavior of the target object based on the at least two second confidences respectively corresponding to each image block in the sequence of image blocks and second thresholds respectively corresponding to the at least two second preset behaviors.

7. The computer-readable non-transitory storage medium according to claim 6, wherein the obtaining a sequence of image blocks containing a target part of a target object from a plurality of video frames obtained by a camera apparatus disposed in a mobile device includes:

for any video frame in the plurality of video frames obtained by the camera apparatus disposed in the mobile device, obtaining an image area that is in the video frame and contains at least one target part of the target object, to obtain at least one image area;

determining a target area of the video frame based on the at least one image area; and obtaining an image block that is of the video frame and contains the target part of the target object based on the target area of the video frame.

8. The computer-readable non-transitory storage medium according to claim 6, wherein the determining the behavior type to which the behavior of the target object belongs based on the plurality of first confidences respectively corresponding to each image block in the sequence of image blocks and first thresholds respectively corresponding to the plurality of first preset behaviors includes:

calculating an average value for the first confidences of a same first preset behavior among the plurality of first confidences respectively corresponding to each image block in the sequence of image blocks, to obtain first confidence average values respectively corresponding to the plurality of first preset behaviors, and determining the behavior type to which the behavior of the target object belongs based on the first confidence average values respectively corresponding to the plurality of first preset behaviors and the first thresholds respectively corresponding to the plurality of first preset behaviors;

or calculating, based on a weight value respectively corresponding to each image block in the sequence of image blocks, a weighted average value for the first confidences of a same first preset behavior among the plurality of first confidences respectively corresponding to the each image block, to obtain first confidence weighted values respectively corresponding to the plurality of first preset behaviors, and determining the behavior type to which the behavior of the target object belongs based on the first confidence weighted values respectively corresponding to the plurality of first preset behaviors and the first thresholds respectively corresponding to the plurality of first preset behaviors, wherein the weight value corresponding to the image block in the video frame that is obtained later is not larger than the weight value corresponding to the image block in the video frame that is obtained previously.

9. The computer-readable non-transitory storage medium according to claim 6, wherein the behavior recognition method further includes:

if the behavior type to which the behavior of the target object belongs satisfies the second behavior type, taking the first preset behavior corresponding to the first confidence of which a magnitude relationship with the first threshold satisfies a predetermined condition as the behavior of the target object.

10. The computer-readable non-transitory storage medium according to claim 6, wherein the for any image block in the sequence of image blocks, determining, based on the second feature vector of the image block, confidences that the behavior of the target object is each of at least two second preset behaviors, to obtain at least two second confidences includes:

for any image block in the sequence of image blocks, fusing a plurality of first confidences corresponding to the image block and the second feature vector of the image block, to obtain a fusion feature vector of the image block; and based on the fusion feature vector of each image block in the sequence of image blocks, determining the confidences that the behavior of the target object is each of at least two second preset behaviors, to obtain at least two second confidences.

11. An electronic device, wherein the electronic device includes:

a processor; and a memory configured to store processor-executable instructions, wherein the processor is configured to read the executable instructions from the memory, and execute the instructions to implement a behavior recognition method including:

obtaining a sequence of image blocks containing a target part of a target object from a plurality of video frames obtained by a camera apparatus disposed in a mobile device;

performing feature vector extraction that is based on a first preset behavior to the sequence of image blocks, to obtain a first feature vector corresponding to the sequence of image blocks;

determining a behavior type to which a behavior of the target object belongs based on the first feature vector; and if the behavior type to which the behavior of the target object belongs satisfies a first behavior type, determining the behavior of the target object based on a result of performing behavior recognition on a second preset behavior for the sequence of image blocks, wherein the determining a behavior type to which a behavior of the target object belongs based on the first feature vector includes:

for any image block in the sequence of image blocks, determining, based on the first feature vector of the image block, confidences that the behavior of the target object is each of a plurality of first preset behaviors, to obtain a plurality of first confidences; and determining the behavior type to which the behavior of the target object belongs based on the plurality of first confidences respectively corresponding to each image block in the sequence of image blocks and first thresholds corresponding to the plurality of first preset behaviors;

wherein at least one first preset behavior in the plurality of first preset behaviors belongs to the first behavior type, and at least one first preset behavior in the plurality of first preset behaviors belongs to a second behavior type and;

wherein the determining the behavior of the target object based on a result of performing behavior recognition on a second preset behavior for the sequence of image blocks includes:

performing feature vector extraction that is based on the second preset behavior to the sequence of image blocks, to obtain a second feature vector corresponding to the sequence of image blocks;

for any image block in the sequence of image blocks, determining, based on the second feature vector of the image block, confidences that the behavior of the target object is each of at least two second preset behaviors, to obtain at least two second confidences; and determining the behavior of the target object based on the at least two second confidences respectively corresponding to each image block in the sequence of image blocks and second thresholds respectively corresponding to the at least two second preset behaviors.

12. The electronic device according to claim 11, wherein the obtaining a sequence of image blocks containing a target part of a target object from a plurality of video frames obtained by a camera apparatus disposed in a mobile device includes:

for any video frame in the plurality of video frames obtained by the camera apparatus disposed in the mobile device, obtaining an image area that is in the video frame and contains at least one target part of the target object, to obtain at least one image area;

determining a target area of the video frame based on the at least one image area; and obtaining an image block that is of the video frame and contains the target part of the target object based on the target area of the video frame.

13. The electronic device according to claim 11, wherein the determining the behavior type to which the behavior of the target object belongs based on the plurality of first confidences respectively corresponding to each image block in the sequence of image blocks and first thresholds respectively corresponding to the plurality of first preset behaviors includes:

calculating an average value for the first confidences of a same first preset behavior among the plurality of first confidences respectively corresponding to each image block in the sequence of image blocks, to obtain first confidence average values respectively corresponding to the plurality of first preset behaviors, and determining the behavior type to which the behavior of the target object belongs based on the first confidence average values respectively corresponding to the plurality of first preset behaviors and the first thresholds respectively corresponding to the plurality of first preset behaviors; or calculating, based on a weight value respectively corresponding to each image block in the sequence of image blocks, a weighted average value for the first confidences of a same first preset behavior among the plurality of first confidences respectively corresponding to the each image block, to obtain first confidence weighted values respectively corresponding to the plurality of first preset behaviors, and determining the behavior type to which the behavior of the target object belongs based on the first confidence weighted values respectively corresponding to the plurality of first preset behaviors and the first thresholds respectively corresponding to the plurality of first preset behaviors, wherein the weight value corresponding to the image block in the video frame that is obtained later is not larger than the weight value corresponding to the image block in the video frame that is obtained previously, or the behavior recognition method further includes:

if the behavior type to which the behavior of the target object belongs satisfies the second behavior type, taking the first preset behavior corresponding to the first confidence of which a magnitude relationship with the first threshold satisfies a predetermined condition as the behavior of the target object.

14. The electronic device according to claim 11, wherein the for any image block in the sequence of image blocks, determining, based on the second feature vector of the image block, confidences that the behavior of the target object is each of at least two second preset behaviors, to obtain at least two second confidences includes:

for any image block in the sequence of image blocks, fusing a plurality of first confidences corresponding to the image block and the second feature vector of the image block, to obtain a fusion feature vector of the image block; and based on the fusion feature vector of each image block in the sequence of image blocks, determining the confidences that the behavior of the target object is each of at least two second preset behaviors, to obtain at least two second confidences.

* * * * *